United States Patent [19]

Beck

[11] 4,213,513

[45] Jul. 22, 1980

[54] IGNITION CONTROL SYSTEM WITH SAFETY SWITCHES

[75] Inventor: Frederick R. Beck, Valparaiso, Ind.

[73] Assignee: McGill Manufacturing Company, Inc., Valparaiso, Ind.

[21] Appl. No.: 918,941

[22] Filed: Jun. 26, 1978

[51] Int. Cl.² ............................................. B60K 28/00
[52] U.S. Cl. ............................. 180/272; 123/198 DC; 180/190; 200/16 A; 200/61.85
[58] Field of Search ............ 180/5 R, 99, 77 R, 82 R, 180/271, 272, 190; 123/198 DC, 198 DB; 200/161, 61.85, 16 A, 159 A

[56] References Cited

U.S. PATENT DOCUMENTS

| | | | |
|---|---|---|---|
| 3,672,344 | 6/1972 | Albertson | 123/198 DB |
| 3,769,481 | 10/1973 | Raab | 180/82 R |
| 3,789,938 | 2/1974 | Hetteen | 180/5 R |
| 3,798,402 | 3/1974 | Raab | 123/198 DC |
| 3,818,169 | 6/1974 | Kubernus | 200/159 A |
| 3,845,847 | 11/1974 | Camp | 123/198 DC |
| 3,881,461 | 5/1975 | Filip | 123/198 DC |

*Primary Examiner*—John A. Pekar
*Attorney, Agent, or Firm*—Foorman L. Mueller

[57] ABSTRACT

A control system for the ignition circuit and carburetor of an internal combustion engine wherein a hand throttle lever is operatively connected to both a spring-urged carburetor lever and to switch means for the ignition circuit to provide normal operation of the engine but principally to provide for the safety of the operator in the operation of such circuit if the throttle lever becomes jammed or frozen or otherwise maintained in a speeding position and the operator loses control of such system. Three switches are mounted in a single housing which in turn is mounted on the handle or guiding bar for the vehicle, with one switch at the top portion of the housing and the other of two interrelated switches at the lower portion and each operatively connected to the throttle lever for operation of the ignition system while the third switch can be independently pushed by the operator to alone open said ignition circuit, with all three operating on a printed circuit panel within the housing which serves both as the electrical circuit for the three switches and the mounting member therefor in the complete control mechanism. The two interrelated switches can be identified as switches I and II and the third switch as a "kill switch". The throttle lever is mounted at its upper end and at the upper rear portion of the housing in a pin and enlarged slot mounting which provides a lost motion pivotal connection at said slot.

19 Claims, 19 Drawing Figures

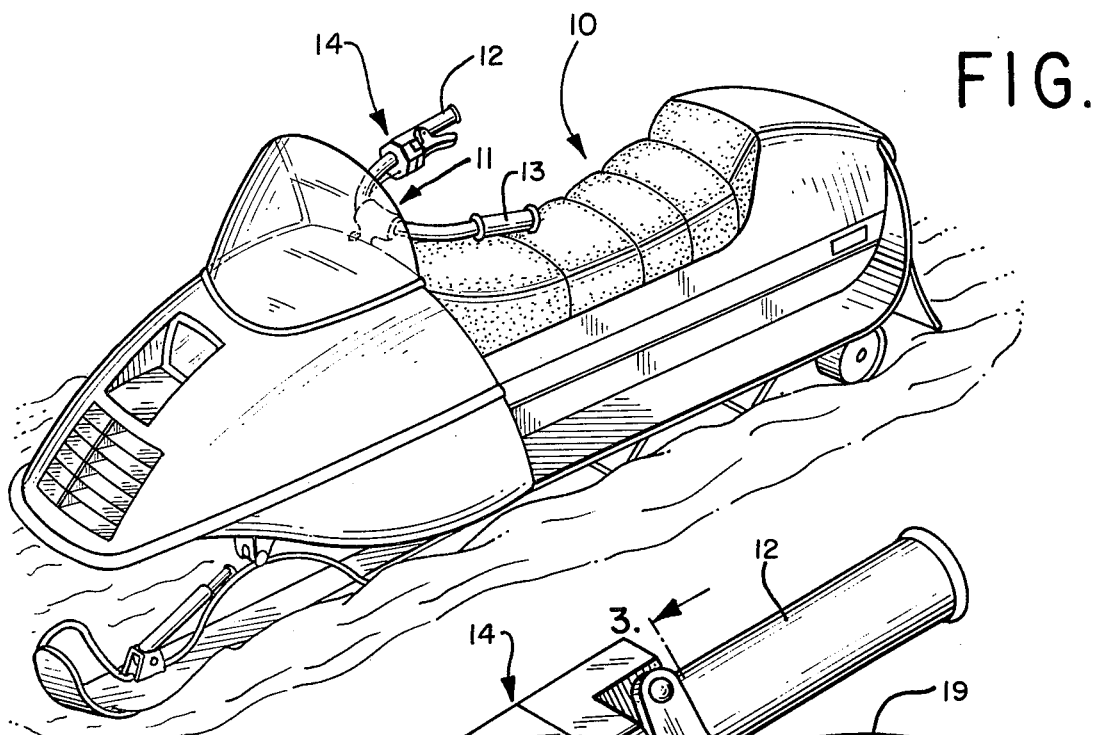
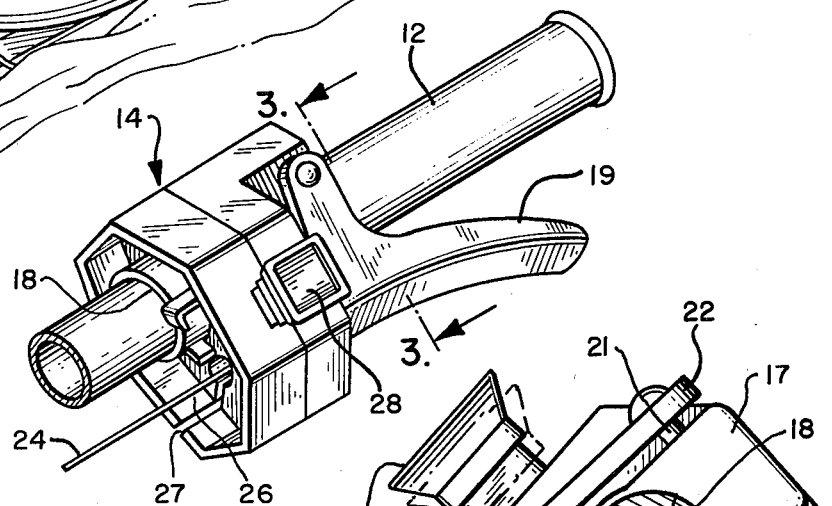
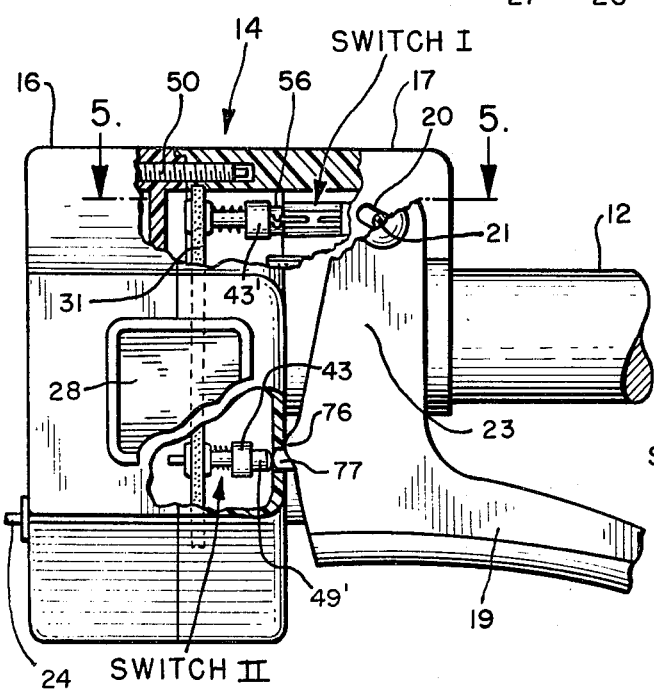
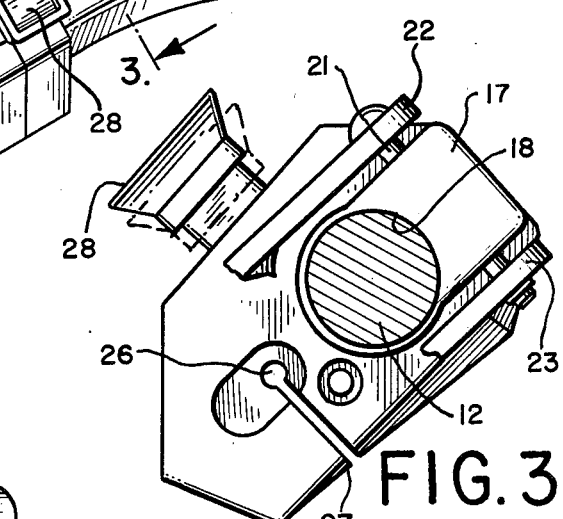
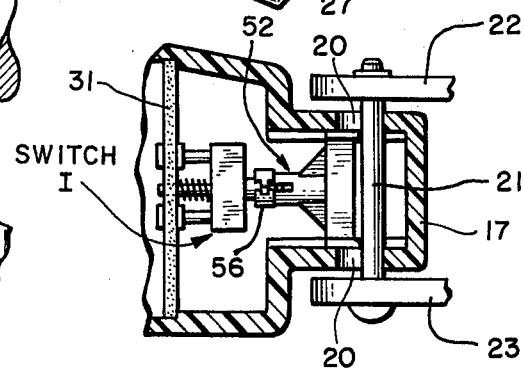

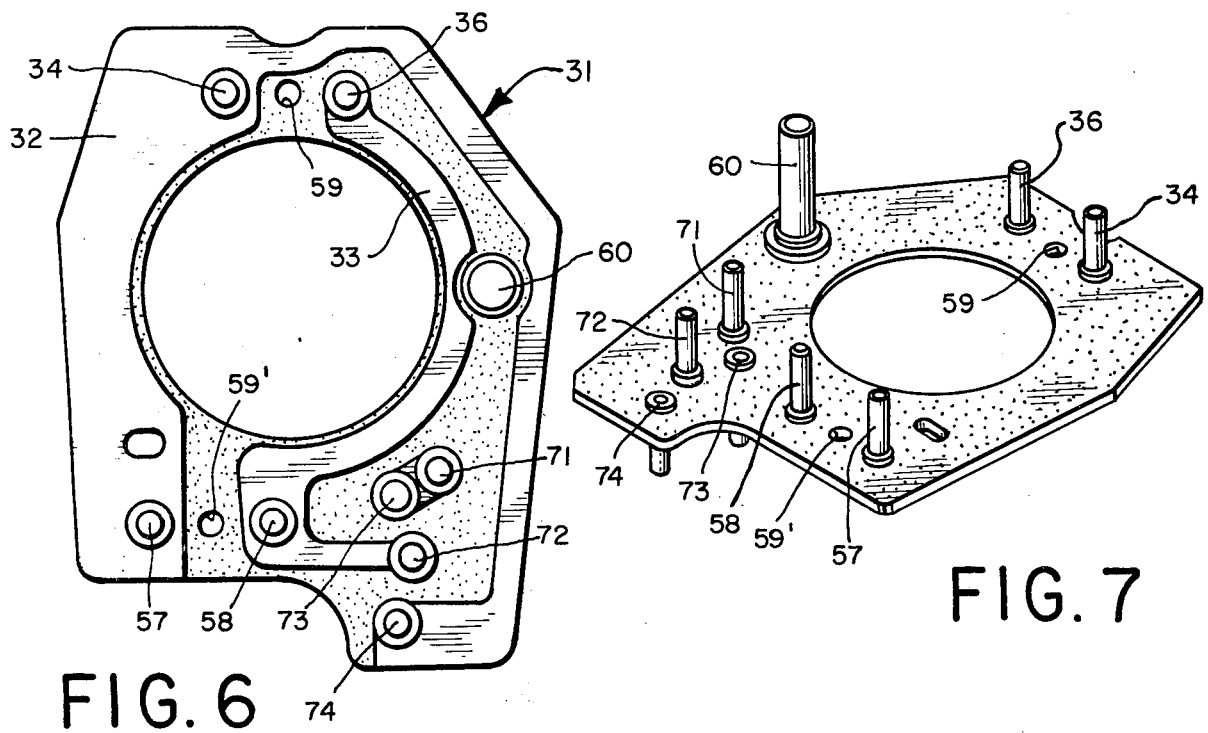
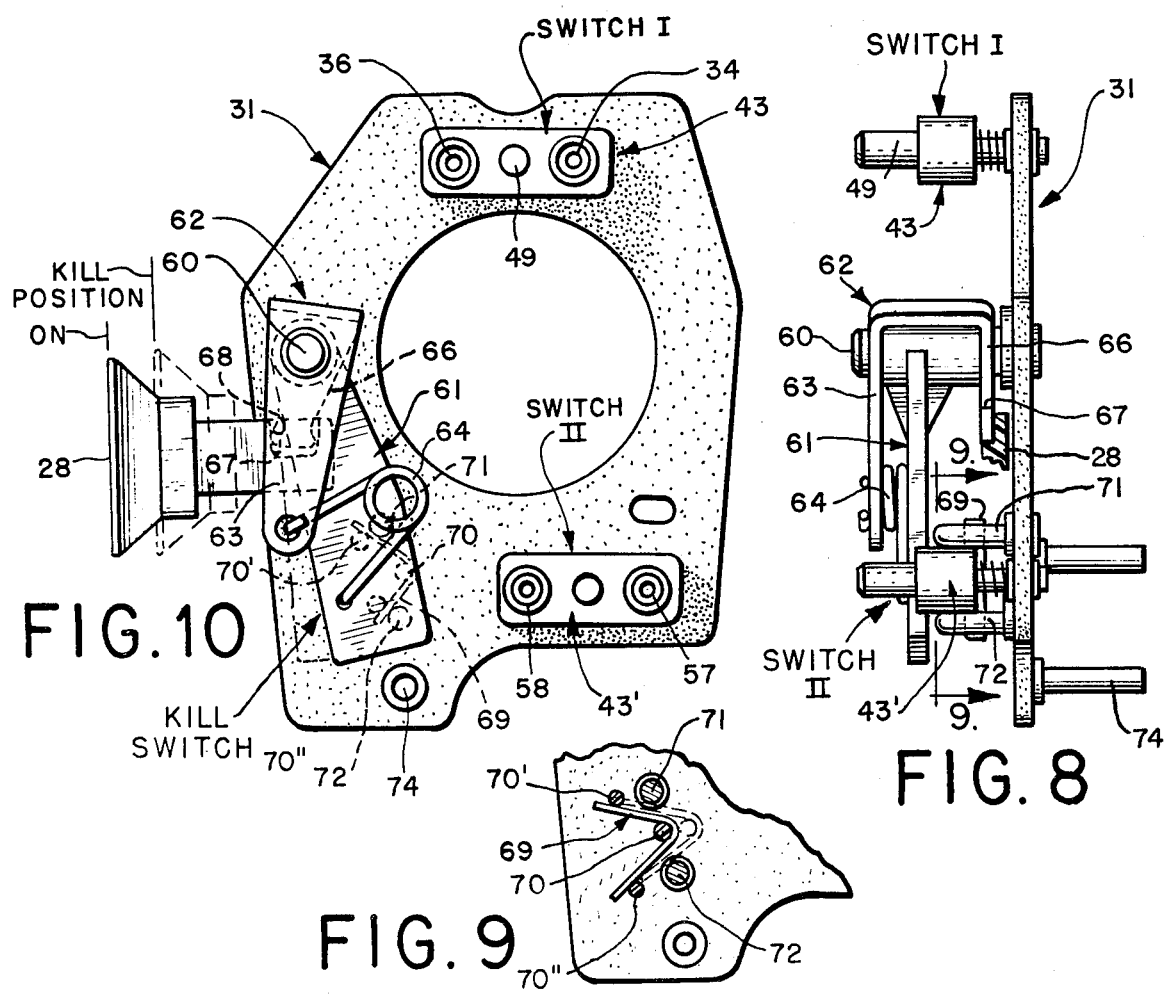

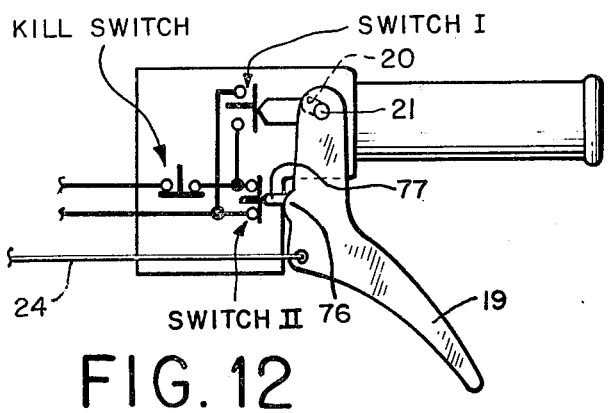
FIG.12
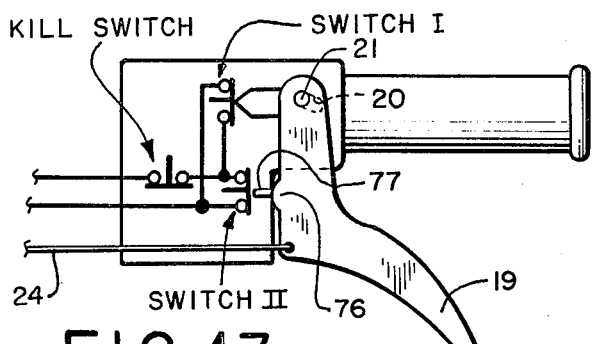
FIG.13
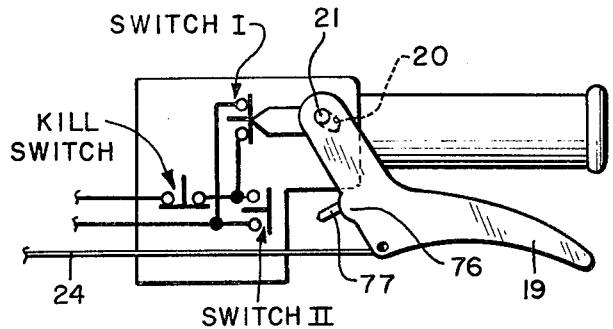
FIG.14
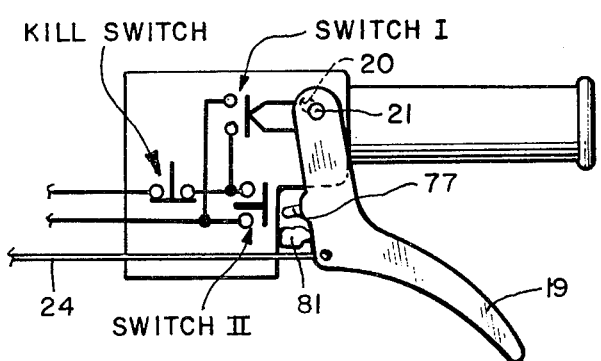
FIG.15
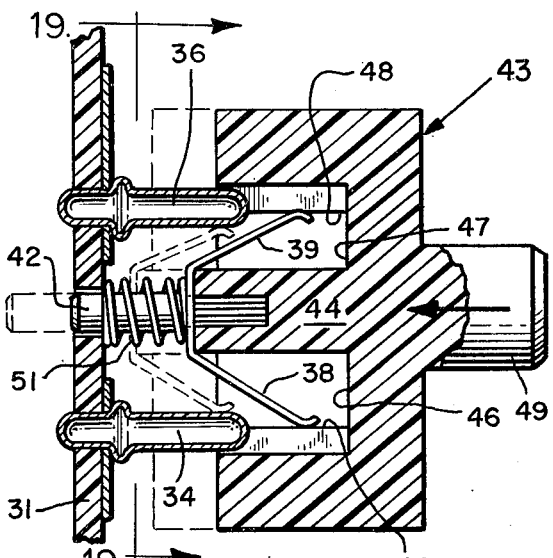
FIG.11
| LEGEND: CLOSED= ▬ OPEN ▯ | | | | |
|---|---|---|---|---|
| FUNCTION / SWITCH | IDLE | ACC. | RUN | FAILSAFE |
| KILL | ▬ | ▬ | ▬ | ▬ |
| SWITCH 1 | ▯ | ▬ | ▬ | ▯ |
| SWITCH 2 | ▬ | ▬ | ▯ | ▯ |
| FIGURE | 12 | 13 | 14 | 15 |
FIG.16
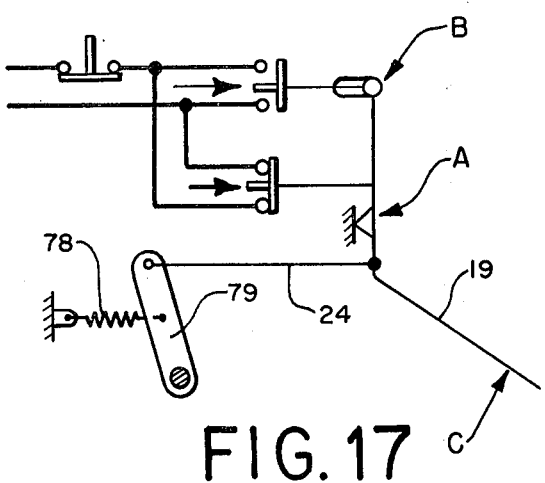
FIG.17

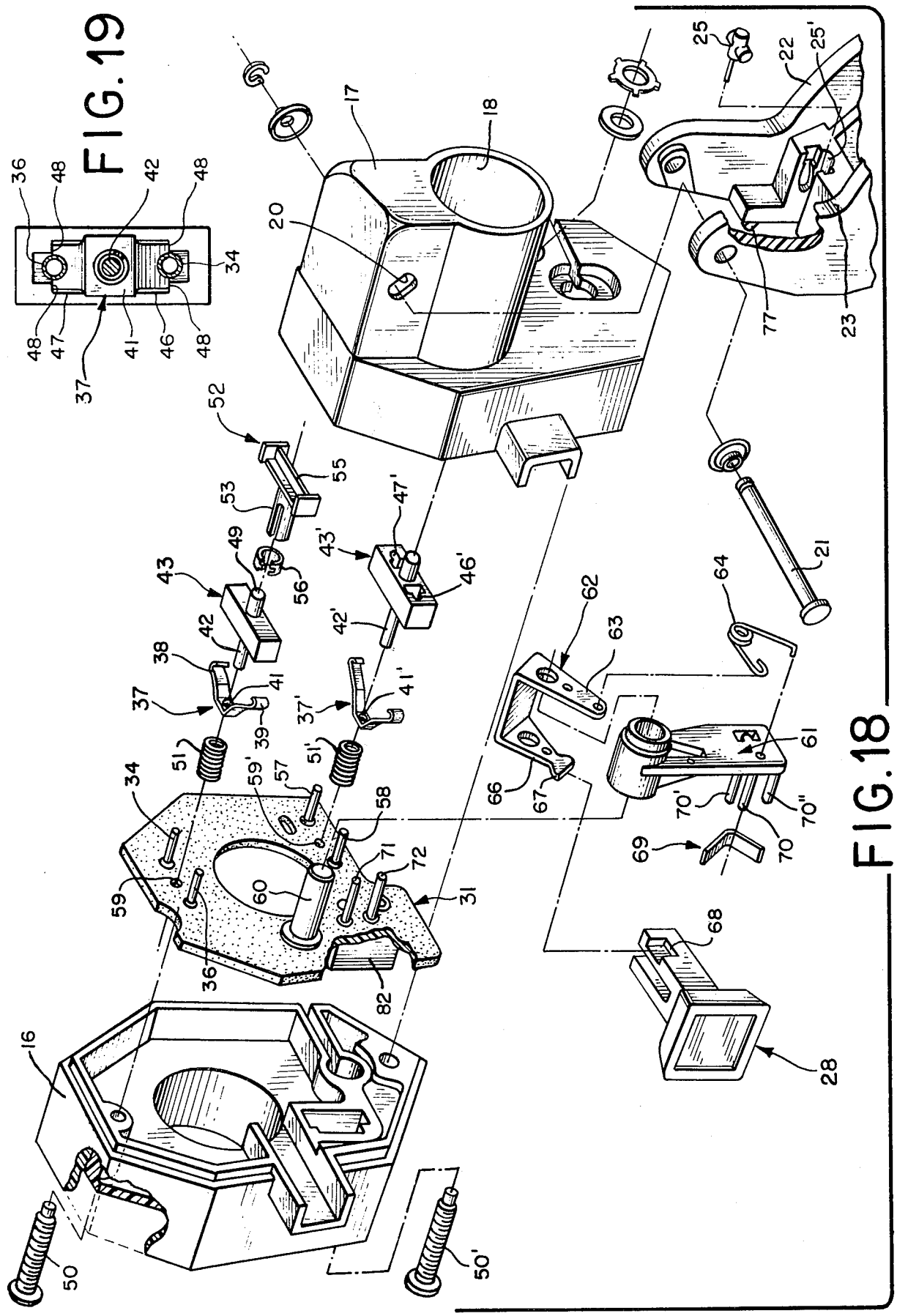

IGNITION CONTROL SYSTEM WITH SAFETY SWITCHES

BACKGROUND OF INVENTION

The present invention provides a fail-safe control system particularly adapted for an internal-combustion-engine-driven snowmobile, but is also adapted for application to high speed outboard motor driven boats, motorcycles, engine driven riding lawnmowers, and similar units (all called "vehicles" in this specification) where the operator normally guides and operates the engine of the vehicle from throttle lever in an exposed position such that it can be jammed by a foreign object getting into the throttle lever assembly, or it will freeze and stick, or otherwise fail to decelerate the engine while operating at what could be a dangerous speed. Snowmobiles in particular have become popular and useful both for commercial and sports purposes and operating in cold weather, snow, and often in the brush these are particularly vulnerable to jamming, freezing, or the like in the throttle system such that the safety of the operator is in jeopardy if the vehicle cannot be stopped when the operator loses control of the unit.

This problem has been attacked in switches for such vehicles to insure the safety of the operator and U.S. Pat. No. 3,672,344 which issued June 27, 1972 on an application filed Sept. 11, 1970, U.S. Pat. No. 3,789,938 which issued Feb. 5, 1974 on an application filed Apr. 24, 1972, as well as U.S. Pat. No. 3,798,402 issued Mar. 19, 1974 on an application filed Apr. 19, 1972 are the answers of these patentees to a so-called safety system for such a vehicle. However, none of these prior switch systems provide the necessary safety to the operator for no one takes care of the situation wherein the engine is operating at high speed and the operator is unable to move the throttle lever and decelerate or stop the engine because of some one of the conditions described above, or the operator is thrown from the vehicle. There are also mechanical deficiencies in these prior switch systems independently of the lack of complete safety, but the latter is the significant problem which the present invention solves while providing a more sturdy, compact switch and control mechanism in a single housing with a throttle lever therewith and with the housing mounted on the handlebar of the vehicle.

One of the important uses for snowmobiles is in the brush or in rough country, or in other environments where the exposed position of the control and guiding mechanism in the open cockpit is particularly vulnerable to twigs, branches, and other foreign materials becoming wedged in the throttle control system at the handlebar. Furthermore, snowmobiles are operated in exceedingly cold climates where heavy gloves are necessary for the operator, and these can become jammed in the throttle mechanism without fault of the driver. The control system of the present invention takes care of these situations, and the switches thereof act to open the ignition circuit for the engine and stop the engine should the driver lose control because of the conditions mentioned, and this system causes the engine to decelerate to idle condition should the operator lose control by falling from the vehicle while operating at high speeds.

SUMMARY OF INVENTION

The control system of the present invention comprises a single two-part plastic housing adapted to fit directly on the handlebar of a snowmobile or the like having a throttle lever on the outside of the housing for engine control and pivotally supported by a pin mounted in an elongated slot in the housing to permit both pivotal and longitudinal movement of such pin in such slot. The housing includes a bore portion to accommodate the handlebar, and the throttle lever straddles the handlebar rearwardly on the housing and is mounted so as to be convenient to the driver or operator while he guides the vehicle with the handlebar. Within the housing and concentric with the bore for the handlebar so as to surround the same is a printed circuit board with contact pins and pivot supports selectively placed on the board and extending at right angles thereto with printed circuitry electrically connecting those pins while serving as contacts to three switches within the housing. Two of these switches are the principal operating switches for the ignition circuit of the internal combustion engine for the vehicle and are connected in parallel through the printed circuitry with such ignition circuit. These two switches are interrelated, are both operatively connected to the pivoted throttle lever, and each is selectively operated depending upon the position of the throttle lever to provide an idling speed or an accelerating operating speed for the internal combustion engine. The third switch mechanism in the control system is mounted within the housing, is connected to contact pins in the printed circuitry on the panel, and is operated by a manually operated button to open the ignition circuit in case of an emergency in which the operator is able to act and push the button inwardly toward the housing. It is commonly called a "kill" switch in this art and the present switch is always connected into one lead of the ignition circuit so as to open the circuit and kill the engine even though one or both of the normal operating switches are closed in such circuit.

With a single two-part housing, the single printed circuit board panel is a significant electrical and mechanical element in the assembly, the throttle lever, with the three switches compactly and ruggedly mounted within the housing, and with the housing quickly and simply mountable on the handlebar for the vehicle a very satisfactory commercial product is provided. The printed circuit board is electrically connected to the ignition system in a normal manner through electrical cables from the board, and the pivotally mounted throttle lever not only mechanically connects to the two interrelated operating switches, but is mechanically connected by a flexible cable extending from the lower portion of the lever, as will be explained more in detail hereinafter, through a bore in the housing, and connects to the carburetor lever on a carburetor shaft to control the gasoline feed to the engine in a normal manner. The carburetor lever in turn is connected to a return spring on the engine and such spring exerts a continuing bias on the throttle lever which is tensioned as the throttle lever is pivoted toward the handlebar by the operator as speed of the vehicle is increased.

The throttle lever has two integral leg portions on the outside of the housing straddling such housing and is pivoted toward and away from the housing during its normal hand operation by the driver or operator of the vehicle while under spring tension from the carburetor lever arm return spring. The mechanism of the switches and the pivot mounting of the lever under spring tension in the present invention solved the safety problem should foreign material of any kind, or a glove, be wedged between the throttle lever and the back face of the housing when such lever is in a high speed operating position and spaced from the housing. The principal pivot for the throttle lever is a pin supporting both legs of the lever as they straddle the housing with the pin retained in an elongated slot at the upper rear portion of such housing. The pin is operatively connected with switch I in a top position in the housing, and the lever engages a portion of switch II of the interrelated switches at the bottom portion of the housing. Spring pressure within switch I maintains the switch contacts open.

When the engine is started switch II is in closed position for the ignition circuit in an idle position, and as the throttle lever is raised to open the carburetor and to accelerate the engine the mounting pin moves forward in the elongated slot and acts to close switch I. Idle switch II is arranged and dimensioned so that it stays closed until after switch I is closed, and as the throttle-lever is pressed further toward the handlebar the pin moves to the front of the housing slot, switch I remains closed and thereafter switch II opens. The elongated slot mounting the lever pivot pin is only so long as to accommodate closing and opening of switch I and does not in any way result in a sloppy feel to the vehicle driver for the throttle lever, for with substantial speeds being possible with a snowmobile over smooth as well as very rough terrain it is important that the operator have a solid feel at his fingers and his hand on the handlebar for the throttle lever.

Switches I and II are in parallel in the ignition circuit through the circuit panel, and as described, one or both are closed to complete that circuit while the engine is running. The "kill switch" is closed at all times until manually opened and when opened breaks the ignition circuit and kills the engine. The dimensions or adjusted dimensions for switches I and II and the spring pressures on the contact members in such switches are such that as the throttle lever is moved upwardly and the engine accelerates the desired operations through the switches take place. To decelerate the engine, the throttle lever is released in the degree desired by the operator or driver, the spring tension on the throttle cable takes effect to pivot the throttle lever at its pin mounting, the lever engages and closes switch II, and the spring in switch I which has been compressed moves the spring contact out of engagement with pins on the control board to open that switch. However, if something prevents that full pivoted movement and jams the lever in its operating position with switch I closed, even though switch II is open in the ignition circuit, then with the driver's hand pressure removed from the throttle the retracting spring force on the carburetor cable to the throttle and the spring pressure in switch I take over and forces the top of the lever rearwardly in the elongated slot, opens switch I and opens the ignition circuit. Similarly, should the operator fall from the vehicle and his hand pressure removed from the throttle lever, if the throttle lever is jammed, both switches will be open. If the throttle lever is not jammed and pivots back to a normal decelerated idle position under the force of the spring on the throttle cable, the snowmobile stops at that time.

DESCRIPTION OF THE DRAWINGS

Referring now to the drawings;

FIG. 1 is a general illustration of a snowmobile showing the open cockpit or seating arrangement, the handlebar, and the present control system thereon;

FIG. 2 is a side view of the complete control system in the position of FIG. 1 as mounted on a portion of the handlebar;

FIG. 3 is a plan view at the line 3—3 in FIG. 2 looking in the direction of the arrows there shown with a fragment of the lever;

FIG. 4 is a side view of the housing and throttle lever for the complete unit mounted on the handlebar but turned some 60° clockwise from the position of FIG. 1 and showing in broken sections the first and the second switches as well as the elongated slot for the throttle lever pivot pin, with such portions in a size corresponding to a commercial embodiment;

FIG. 5 is a fragmentary cross-section through the line 5—5 of FIG. 4 and showing the detail of the pivot pin, slot, printed circuit board and elements of the first switch in the system;

FIG. 6 is a view of the printed circuit board, circuitry, and contact pins looking rearwardly from the front of the vehicle;

FIG. 7 is a view of the opposite side of the printed circuit board turned 180° clockwise from the position of FIG. 6;

FIG. 8 shows the assembly of the toggle-action mechanism of the "kill switch" in a side view on the circuit board together with switches I and II;

FIG. 9 is a detail of the switch bridge through line 9—9 and looking in the direction of the arrows in FIG. 8 with such bridge in closed and in open positions;

FIG. 10 is a face view of the "kill switch" looking to the right as the switch is illustrated in FIG. 8, and showing such switch in closed and open circuit positions;

FIG. 11 is an enlarged detail of switch I with the contact bridge in closed and open positions;

FIGS. 12 to 15 and 17 are diagrammatic views of the control system and ignition circuit as will be described in detail hereinafter, with FIG. 17 illustrating particularly pivot points for the throttle lever with the carburetor lever arm return spring and throttle cable;

FIG. 16 is a table showing the functional condition of each of the three switches in the control system at four operating and/or open circuit positions;

FIG. 18 is an exploded view of operating elements of the complete control system with a portion of the printed circuit control panel and a portion of the throttle lever fragmentized, as well as the throttle cable for connection to the carburetor lever; and FIG. 19 is a front face view of the spring contact and molded guide member alone from FIG. 11.

DETAILED DESCRIPTION OF INVENTION

The control system of the present invention is illustrated as applied to a snowmobile in FIG. 1, but as previously pointed out it has an application for other internal combustion engine driven vehicles such as a marine unit with an outboard motor, a motorcycle, a rider-driven lawnmower, and the like where the possibility exists that something will happen to the control system or to the operator while the vehicle is travelling at a speed such that the vehicle gets out of control and it is necessary to have the engine stopped without using the manually operated "kill switch" or "panic button" in the present control system, but at the same time having the latter available.

The vehicle 10 has an open cockpit or seat for the operator and a handlebar unit 11 with the control system of the present invention shown here as mounted on the right-hand portion 12 while a hand brake is normally carried on the left-hand portion 13 of the handlebar. The complete mounted control system 14 is shown on the handlebar 12 in FIG. 1 and in a larger view in the same position in FIG. 2, while FIG. 4 shows the unit in actual size corresponding to one commercial embodiment of the invention. As viewed from the outside of the control system in FIGS. 1 through 3 a housing is provided in two plastic parts 16 and 17 fitting together into a closed unit with a bore 18 to accommodate the handle 12 extending through the entire housing. A one-piece molded throttle lever 19 is pivotally mounted in an elongated slot 20 in the housing by a pin 21 smaller in diameter than the slot is long and wide, with legs 22 and 23 (FIG. 5) straddling the outside of the housing and hence the handle 12 and being connected to a carburetor lever arm by a throttle cable 24 releasably connected at an anchor 25 (FIG. 18) with the throttle lever 19, and positioned in a cavity 25' within the lever and extending through a bore 26 shown at the front of the housing in FIG. 2 and at the rear of the housing in FIG. 3. A slot 27 opening from one side of the housing permits the throttle cable to be readily disconnected from the lever 19, or changed upon breaking without disassembling the control system housing in any way. A button 28 for the "kill switch" extends out of the housing on the inside as it is viewed when mounted on the handlebar 12 and readily available to the operator just as the throttle lever 19 is operated by the driver of the vehicle while his hand is on the handlebar itself.

The ignition circuit and three switches are shown diagrammatically in FIGS. 12 to 15 and 17 for the operation of the internal combustion engine after it is started and show the switch and throttle lever position from an idle mode through an accelerating mode to the fully accelerated running mode. Switch I is at the top of the housing as viewed in FIG. 3 and switch II at the bottom of such housing, with the "kill switch" to one side as shown in FIG. 10.

The stationary contacts for such two operating switches, as well as the stationary contacts for the "kill switch" are all provided on a printed circuit board or panel 31 shown in a face view in FIG. 6, and in a reverse position in a perspective view in FIG. 7. The view in FIG. 6 is looking from the front of the housing in its position on the handlebar in FIGS. 1 and 2, while the view turned through 180° in FIG. 7 is looking from the rear toward the front of the control assembly on the snowmobile. The insulating board for the panel 31 provides a rugged foundation for the printed circuitry thereon, a sturdy base for the contact and support pins secured thereto, and an equally rugged member of the complete mechanical assembly for the system within the housing 14 as mounted in the part 17 of such housing.

The conductive metal for the switches and the ignition circuit includes portion 32 (FIG. 6) extending around three sides at the perimeter of the face of the board or panel 31 and a second portion 33 internally of the first portion. The electric contact pins 34 and 36 for switch I are secured in the panel 31, are electrically connected to the two conductors 32 and 33, and protrude from the back side to the front side as shown in FIGS. 6 and 7. Such pins for switch I are engaged by a U-shaped contact member 37 (FIG. 18) with spring contact arms 38 and 39 and a mounting hole 41 which receives the pin 42 integral with and projecting forwardly from a molded insulating carrier 43, which has a base 44 for the pin 42 that is also a part of the wall of the carrier and forming a pair of cavities 46 and 47 (FIG. 11). Each cavity 46 and 47 has a ledge 48 thereon which serves as a support for the respective contact arms 38 and 39 on the member 37. The enlarged detail in FIG. 11 is turned 90° clockwise relative to FIG. 18, for instance, so that the contact pins 34 and 36 and the contact arms 38 and 39 are more readily understandable with the carrier 43. As shown in FIG. 19 in a front view of the molded guide or carrier 43, and then in cross-section in FIG. 11, the arms of the spring contact 37 are positioned on the ledges in open circuit position in full lines and in closed circuit position in dotted lines, and illustrate the lateral movement of each arm 38 and 39 as each engages a corresponding contact pin.

The carrier 43 also includes a stud portion 49 as shown in FIGS. 11 and 18 for operative connection with the throttle lever. The contact bridge 37 is biased in its assembled position on the carrier 43 by a spring 51 mounted on the projection or pin 42 and abutting the PC board or panel 31 at one end and the bridge 37 at the other end. Pins 34 and 36 in the PC board 31 are engageable respectively in a wiping contact action with the contact portions 38 and 39 when the carrier is in closed circuit position as shown in dotted lines in FIG. 11.

The elements so far described for switch I are all employed in the assembly of switch II and the same numbers heretofore described for the elements of switch I are used in switch II merely with a prime added, except that the carrier 43' for switch II as shown in FIG. 18 has open cavities 46' and 47' permitting a longer relative movement between the pins 57 and 58 in the cavities and the carrier 43', upon movement of the latter.

In the operative connection to the throttle lever 19, switch I includes a guide member 52 comprising an elongated body 55 which engages the pivot pin 21, and a portion 53 comprises a collet type sleeve engaging the stud 49 on the carrier. The collet type sleeve portion 53 is maintained on the stud 49 by a spring ring type retainer 56 (FIGS. 5 and 18) encircling the sleeve. When the switch is assembled in the housing 14 the guide 52 and carrier 43 are only partially coupled together at the stud and sleeve. After all of the components of the system are assembled in the housing and the two pieces 16 and 17 secured together by drive screws 50 and 50' (FIG. 18) force is applied to the throttle lever 19 and the pivot pin 21 is forced to the extreme front end of the elongated slot 20 toward the board 31. This action drives the carrier 43 to a forward position in engagement with the ends of the contact pins 34 and 36, and continued pressure on the guide 52 by the pivot pin 21 causes the joint between the collet sleeve 53 and stud 49 on the carrier 43 to slip until the pivot pin 21 engages the furthest forward edge of the slot 20 in the housing corresponding to the position of the lever in FIG. 13. In a commercial embodiment of the invention as illustrated in the drawings, the ends of the contact pins 34 and 36 must be 0.045" from this extreme position to break contact with the contact wiper. The slot 20 and the pin 21 allow 0.090" axial movement of the guide 52. Therefore, in this final adjusted position of switch I with the sleeve 53 fully engaged and the spring clamp 56 holding the same the switch will open in the ignition circuit when the throttle lever pin 21 is allowed to back away 0.045" from the board 31. With this structure and assembly for switch I the dimensions and the amount of travel can be altered as desired for different applications, but these dimensions given apply to the commerical embodiment here illustrated.

Switch II is for idle position of the engine and ignition circuit and as is shown in FIGS. 12 and 18 has a carrier 43' and spring contact bridge 37' essentially the same as described for switch I. It is assembled and operates on pins 57 and 58 mounted in the PC board 31 with the projection 42' fitting into a hole 59' in the PC board in the same manner that the projection 42 of switch I fits into the hole 59 at the top of the PC board as viewed in FIGS. 6 and 7 as well as FIG. 18.

As previously referred to, the differences in the carriers 43 and 43' (FIG. 18) are required in this commercial embodiment so as to permit a greater amount of overtravel in switch II than in switch I, and the cavities 46' and 47' extend through the body of the carrier while they do not do so in carrier 43. The cavities 46 and 47 are closed in carrier 43 because it bottoms out against the ends of the contact pins 34 and 36 as described for the self-adjustment structure of switch I in initially adjusting the travel in that switch. In that respect there is not enough physical space in the housing to accommodate the self-adjusting feature for switch II, for as shown in FIGS. 4 and 18, the housing part 17 is enlarged at the upper portion relative to the lower portion and thus accommodates the longer assembly for switch I.

The "kill switch" mechanism will be described, and then the operation of all three switches will be described relative to the diagrammatic illustrations of the system in FIGS. 12 to 15 and 17.

The "kill switch" assembly as illustrated in FIGS. 8, 9 and 10 will be described along with the elements in the exploded view of FIG. 18 which latter comprise a molded plastic carrier 61 mounted on a pin 60 in the PC board 31 which also pivotally supports a U-shaped actuator 62 having one leg 63 connected with the carrier 61 through a torsion spring 64 while the other leg 66 includes a tang 67 thereon fitting into a cavity 68 in the shank of the button 28 for such switch. The operating mechanism for the "kill switch" is of the general toggle action type wherein pressing the button 28 inwardly as viewed in FIG. 10 pivots the U-shaped member 62 in a manner such that the torsion spring 64 is put under increased tension and pivots the carrier 61 to an open circuit position with the bridge member 69 in full line position in FIG. 9 tensioned in the three integral plastic pins, 70, 70', 70'' moved from the dotted line position where it electrically engages the contact pins 71 and 72. In reverse, when the "kill switch" is set in closed-circuit position for the ignition circuit, the button 28 is pulled out, toggle action occurs, and the V-shaped contact bridge 69 engages the two pins 71 and 72 in a wiping contact which knocks off any oxidation or foreign material and provides a good electrical contact through such switch. FIG. 9 is not large enough to permit an illustration of insulating pins 70, 70' and 70'' as well as contact pins 71 and 72 in each of the two positions of contact bridge 69. Bridge 69, just as bridges 37 and 37', can be described either as U-shaped or V-shaped.

The pins 73 and 74 in the P.C. board 31 are the connections from such board to the ignition system for the internal combustion engine, and a plastic clip 82 (FIG. 18) holds a connector in position on such pins.

Referring to FIGS. 12 to 15 inclusive for the operation of the system, these illustrate the position of the three switches in the system as functionally shown in FIG. 16. FIG. 7 is revised relative to the other four circuit diagrams merely to more simply illustrate the pivot points in the system and the spring forces acting on the throttle lever and switches I and II which provide the reliable running as well as the fail-safe operation of the system.

First; more details as to the throttle lever 19 which includes an integral bump 76 on the leg portion 23 in contact with the rear face of the housing (FIG. 4), and an integral projection 77 on the leg portion 22 in contact with stud portion 49' on the carrier 43' for switch II. FIGS. 12 and 17 illustrate the starting or idle position for the ignition circuit with the lever 19 at its position of rest and the spring 78 attached to the pivoted carburetor arm 79 acting on such arm to pull the cable 24 and retain the throttle lever 19 at the position of rest or at idle mode. From this position as the lever 19 is pulled or pressed upwardly by the operator whose hand is on the handlebar 12 and whose fingers are on the throttle lever, the projection 77 of the lever 19 engages the stud 49' on carriage 43' and the spring tension on the cable 24 maintains the switch II closed, but as the lever 19 is pivoted at the bump 76 against the rear face of the housing the pivot pin 21 at the slot 20 moves forwardly in such slot as shown in FIG. 13. The members 43 and 52 between the pivot pin 21 and the contact bridge 37 move the arms 38 and 39 of the latter into the carriage cavities 46 and 47 (FIG. 11) and engage the contact pins 34 and 36 as shown in dotted lines in such figure. Meanwhile, the spring 78 is tensioned and exerts a force on the lever 19, while springs 51 and 51' are each compressed for each of such operating switches I and II. The outward force from spring 51 is low and approximately 5 oz. in one commercial embodiment while the force of the spring 78 on the throttle cable 24 is high and approximately 18 oz. thus pulling the entire throttle lever 19 toward the housing and maintaining the projection 76 against the switch II carrier 43'. The force of the spring 78 acting on the cable 24 and the upward pressure of the lever 19 to overcome the low spring force acting on the coupling elements of switch I operatively connect spring contact 37 in switch I and the pivot pin 21. Both switches I and II are connected in parallel and both closed at this accelerating position of the throttle lever so there is no possibility of the ignition circuit being opened in this condition of the engine.

As the lever 19 is pulled or pressed in a counterclockwise direction toward the handle 12 as shown in FIG. 14 the lever 19 (or indicated as B) pivots at pin 20 about point B (FIG. 17) and switch II acting from the force of spring 51' opens at the spring contact 37' and contact pins 57 and 58. In other words, the pivot point for the throttle lever 19 has changed from A to B in FIG. 17 under the hand pressure acting on the throttle lever 19 at C.

In decelerating or going from the full running speed of FIG. 14 to an idle mode the hand pressure is removed or reduced on the throttle lever 19. With the high spring force from the spring 78 acting on the cable 24 that force pulls the lever downward and forward and the pivot pin 21 is forced to the rear of the slot 20 by that force and the low force from the spring 51 in switch I. The lever 19 would normally pivot to the position of FIG. 12 and the engine would run at idle speed.

However, FIG. 15 illustrates foreign material 81 wedged between the rear face of the housing 14 and the inside portion of the lever 19 so as to prevent the projection 77 from contacting the switch II carrier 42' at 49' and so as to prevent the bump 76 from engaging the housing. As described above, the engine is running at full speed in FIG. 14, and it is at this speed or at least a running speed that the foreign object 81 such as a branch, twig or the operator's glove occupies the illustrated position of an object 81. At that time, the lever 19 is pivoting around point B in FIG. 17, and actually is at the rear end of the elongated slot 20 for the tension on cable 24 and the force of spring 51 causes the pin 21 to move to the rear of slot 20. Switch I is thus open and it has not been possible to close switch II because of the obstruction. The ignition circuit is opened as shown in FIG. 15 even though the operator might be helpless to decelerate the engine to idle mode.

Should the throttle cable 24 to the carburetor arm 79 break, the force from spring 78 on the cable 24 could no longer pivot the lever to the position of FIG. 12, and the force of the respective springs 51 and 51' on switches I and II will maintain the respective bridges 37 and 37' in each switch carrier out of contact with the two terminal or contact pins for each of such respective switches. Likewise, if the spring 78 breaks, or if it becomes disengaged from the carburetor arm 79, switches I and II will open. The ignition circuit with both switches I and II open as in FIG. 15 will be broken and the engine will stop. As has also been described, and as the illustrations show, the circuit can be broken by pushing button 28 and opening that circuit through the "kill switch".

Accordingly, the diagrammatic illustrations in combination with the structural illustrations show that the present invention will provide a ready control of the engine and ignition circuit in an application such as a snowmobile while it is accelerating. In addition, it provides a sturdy and automatically operating system wherein the engine is killed or brought to a stopped idle position should the operator be prevented from himself bringing the vehicle to such a position or condition.

I claim:

1. A control system for an internal combustion engine having a carburetor and an ignition circuit for normal control by an operator of said engine through a closed ignition circuit and said carburetor and for also stopping said engine by opening said ignition circuit in an emergency when said operator loses control of the operation of said control system and hence the engine, including the combination of
    (a) first and second interrelated operating switches for connection to said ignition circuit to control the same through a normal engine operating cycle from starting through full running and through stopping said engine, and a third switch for connection to said ignition circuit solely for actuation by said operator to open said ignition circuit and stop such engine in an emergency independently of the control position of said interrelated switches;
    (b) an insulating board having a printed circuit thereon for electrical connection to said ignition circuit and which is electrically connected to all three switches;
    (c) circuit switching means for each of said three switches mounted with said insulating board and electrically connecting and disconnecting each switching means relative to said printed circuit;
    (d) a housing member mounting said insulating board therein with said three switches supported on said insulating board;
    (e) button means on the outside of said housing having connecting means to said third switch within said housing, for operating said third switch;
    (f) a throttle lever member having a spring tension exerted thereon operatively connected to said carburetor and to said first and said second switches;
    (g) means for mounting said throttle lever member on the outside of said housing member including a slot in one of said members and a pin in the other member for relative pivotal and transverse movement between said pin and said slot and corresponding pivotal and transverse movement of said throttle lever member at one end portion thereof in the course of a said engine operating cycle, and said throttle lever member having a hand grip portion at the opposite end portion thereof with the latter portion being movable away from and toward an outside surface of said housing member;
    (h) said throttle lever member having a bump at said opposite end portion thereof engaging said housing member outside surface as a pivot point for said throttle lever member in an initial movement thereof and thereby causing relative transverse and pivotal movement of said pin and slot to correspondingly move said one end portion of said throttle lever member, and said latter member having a projection thereon extending into said housing member for operative connection with said second switch to close the same, said throttle lever member also acting to close said first switch sequentially relative to said first switch during said pivotal movement of said one end portion and a corresponding transverse movement thereof;
    (i) means in said second switch to open the same after said first switch is closed; and
    (j) said throttle lever member and said button means both being positioned so as to be available to the hand and the fingers of an operator of the engine to permit ready and selective operation of said three switches.

2. In a control system for a snowmobile that has an open seat for an operator and is for travel in rugged weather conditions that include cold, snow, and ice, and in environmental conditions that include bushes, trees, and the like, the snowmobile being powered by an internal combustion engine having a handlebar as the steering means therefor, an ignition circuit, and a carburetor with a spring-biased cable operatively connecting said carburetor and said control system, the combination including
    (a) a housing having a bore therein for receiving said handlebar and being mountable thereon and having an opening therein for receiving and retaining said cable in a spring-biased position, said housing having an outer wall with an outside surface thereon,
    (b) first and second switches mounted within said housing for electrical connection with said ignition circuit, each said switch having a movable carrier, contact means therewith, and spring-biasing means with said contact means providing a spring-bias thereon at a closed-circuit position for said switch, with said spring-bias being capable in and of itself to move said contact means to an open-circuit position, (c) a throttle lever on the outside of said housing member for operating said first and second switches and having an upper portion and a lower portion, with said spring-biased cable operatively connecting said carburetor and said throttle lever and biasing the latter, (d) means mounting said throttle lever on the outside of said housing including a pin in said throttle lever at the upper portion thereof and a slot in said housing adjacent said first switch, and normally being grasped and movable by an operator at said lower portion away from and toward said outside surface of said housing.

(e) a bump at said lower portion of said throttle lever engageable with said outside surface as a pivot point for said throttle lever in an initial operating movement thereof and causing pivotal and transverse movement of said upper portion of said throttle lever, said lever also having a projection at said lower portion for projecting into said housing at a bore therein adjacent said second switch for operative connection with said second switch to close the same; and (f) with said weather and said environmental conditions within which said snowmobile travels being such that an object can become wedged between said lower portion of said throttle lever and the outside surface of said housing when said snowmobile is operating in a full running condition whereby said lever projection cannot project into the housing to close said second switch, said cable spring bias pulls on said throttle lever to in turn move the upper portion thereof until the mounting pin is stopped by the rear extremity of said slot and the operator has lost control of said throttle lever, said spring-bias on said first switch contact means acting automatically to open the ignition circuit through said first switch, and said second switch remaining open with said wedged object preventing the movement of said projecting portion into said bore to actuate said second switch while said spring-bias meanwhile maintains the contact means in said second switch in open position to thereby open said ignition circuit and stop said engine.

3. In a control system for a vehicle powered by an internal combustion engine having an ignition circuit and a carburetor with a spring-biased cable operatively connecting said carburetor and said control system, and having a plurality of switches operatively connected to said ignition circuit and adapted to be operated by an operator for running or stopping said engine and with at least two of said switches being operable to stop said engine automatically if said operator is unable to do so, the improvement comprising (a) three electric switches, (b) a housing for said switches, (c) an insulating board mounted in said housing having circuit means therewith electrically common to said three switches and to said ignition circuit, with said three switches adapted to selectively close and open said ignition circuit, (d) a throttle control pivotally mounted on said housing for actuating two of said three switches and operatively connected to said spring-biased cable, (e) button means mounted in said housing, and operable on the outside thereof for actuating said third switch, (f) means for mounting said throttle control for operating movement in the operation of said vehicle comprising a slot in said housing and a pin in said throttle control positioned in said slot for transverse and pivotal movement therein of said pin and said throttle control therewith, (g) a pair of pin contacts for each of said switches mounted in said insulating board and electrically connected to said circuit means, (h) with each of said three switches having a spring contact member with two contact portions and each one of said two contact portions engageable with a corresponding pin contact, with said spring contact member on each of said two of said three switches being movable by operation of said throttle control into electrical contact with said corresponding two contact pins, and said spring contact member of said third switch being movable into a contact pin connection in said third switch upon an operation of said button means as an alternative to the operation of said throttle control for said two of said three switches.

4. A control system for the operation of the carburetor and the ignition circuit of an internal combustion engine including in combination (a) first and second switches for normal operation of said ignition circuit and for emergency opening of said circuit, and a third switch in said ignition circuit for emergency opening of said circuit and stopping said engine independently of said first and second switches, (b) a housing for said three switches, (c) a throttle control outside said housing adapted to be actuated for operative and selective connection to said first and second switches by an operator, (d) means for mounting said throttle control on said housing comprising a pin in said throttle control and a slot in said housing for transverse and pivotal movement of said pin therein to provide a lost-motion mounting for said throttle control on said housing, (e) and push-button means outside said housing operatively connected to said third switch within said housing, (f) a pair of insulatingly separated contact pins mounted in said housing corresponding to each of said first and said second switches with each contact pin of a pair electrically connected to said ignition circuit, (g) said first switch and said second switch each including a movable insulating carrier mounted on a corresponding pair of contact pins and having a contact bridge with said carrier, with said contact bridge being engageable for electrical connection with a corresponding pair of contact pins upon circuit-closing movement of said carrier, (h) a spring engaging said carrier which is tensioned upon said circuit-closing movement in one direction when said carrier is actuated by said throttle control to close the ignition circuit and when tensioned acts to move said carrier in the opposite direction to open said ignition circuit when said throttle control is not being actuated by an operator, (i) and with said push-button means being pushable by said operator inwardly relative to said housing to actuate said third switch and open said ignition circuit independently of any position of said first and said second switches relative to a closed ignition circuit.

5. An electrical system for controlling an electrical circuit in operating equipment to be connected therewith, including in combination
(a) an insulating housing member,
(b) a printed circuit board mounted within said housing member having a least one circuit thereon for electrical connection to operating equipment to be electrically controlled by said system,
(c) two pairs of contact pins secured in said board with each said pin electrically connected to said circuit,
(d) a bore in said board between each two contact pins in a pair,
(e) a switch in said housing at each said pair of contact pins, each said switch comprising an insulating carrier having a projecting portion thereon positioned in and movable in a corresponding board bore when said insulating carrier is moved,
(f) a spring contact member in operative connection with said carrier and movable therewith for closing or opening an electrical connection with the corresponding contact pins for said switch,
(g) a compressible spring on said projecting portion in a position between said insulating carrier and said board adapted to be compressed when said carrier is movable into closed electrical connection position,
(h) a switch operating lever member on said housing member, and
(i) means for mounting said lever member on said housing member comprising a pin in one of said members and a slot in the other said member receiving said pin for pivotal and transverse relative movement between said pin and said slot, said lever member being adapted alternatively and selectively for operative connection with both switches to close the same in one period of time for the operation of said equipment or for operative connection with said switches one at a time to close them sequentially, said pin and said slot being in one position relative to the other when both switches are closed in said one period of time and said pin and said slot being in another relative position to one another when said switches are being sequentially closed.

6. An electrical control system for control of an electrical circuit including in combination
(a) an insulating housing,
(b) a printed circuit board secured in said housing,
(c) a plurality of pairs of pins mounted on said board in electrical connection with the printed circuitry on said board and with a bore in said board between each said pair of pins,
(d) a plurality of switches with each switch mounted on a corresponding pair of pins,
(e) and each said switch including an insulating member with a projecting portion thereon extending into and movable in said bore when said insulating member moves relative to the corresponding said pair of pins and said printed circuit board, said insulating member having a cavity portion therein fitting over at least a portion of said pair of pins,
(f) a spring contact member on said projecting portion having a pair of legs fitting into said cavity portion to move with said insulating member, with each leg moving laterally as it goes into and out of engagement with a pin of said pair upon said movement of said insulating member and maintaining an electrical connection with a pin when in engagement,
(g) a spring on said projecting portion between said printed circuit board and said insulating member exerting a spring bias on the latter when tensioned,
(h) and actuating means outside said housing pivotally mounted thereon and having a pin and a slot connection with said housing, and being selectively and operatively connectible with said plurality of switches for selectively moving an insulating member in a switch in one direction when an operating force is applied and said actuating means is moved in such one direction to accomplish an electrical connection of said spring contact member with a corresponding pair of pins and also tensioning said spring, with said tensioned spring acting on said insulating member in the opposite direction when said operating force is removed from said actuating means to open the electric circuit through the switch.

7. In a fail-safe control system for a vehicle adapted for use in rugged weather conditions such as cold, snow, and ice, and in environmental conditions with bushes and the like wherein said control system is protected from said weather conditions and said environmental conditions, said vehicle being powered by an internal combustion engine and having steering means, an ignition circuit, and a carburetor with a spring-biased cable operatively connecting said carburetor and said control system, the combination including
(a) a housing member having a bore therein for receiving said steering means and being mountable on said steering means, and said housing member having an opening therein for receiving and retaining said cable in a spring-biased position,
(b) multiple interrelated switch means within said housing member electrically connected with said ignition circuit and adapted to be operated under a pressure including that produced by said spring-biased cable to selectively close and open said ignition circuit, said housing member being structured to protect said switch means from said weather and environmental conditions which would interfere with a normal operation of said control system, each said switch means having contact means therewith, a spring-biasing means with said contact means developing a spring-bias on said contact means at a closed-circuit position for said switch means when said contact means is being moved by operating pressure to a closed-circuit position, and said spring-biasing means being capable in and of itself to move said contact means to open-circuit position when said operating pressure is removed from said contact means,
(c) a throttle lever member on the outside of said housing member operatively connected to each said switch means for selective closing thereof and to said spring-biased cable which maintains a spring-bias thereon, and
(d) means for mounting said throttle lever member on said housing member including a slot in one of said members and a pin secured in said other member and positioned in said slot, with said pin and said slot making possible the pivotal and transverse movement of one said member relative to the other member upon operation of said throttle lever member for the operation of said switch means.

8. In the control system of claim 7 wherein said slot is in said housing member and said pivot pin is in said throttle lever member and is smaller in diameter than the transverse dimension of such slot, said throttle lever member being operatively connected to said contact means in each said switch means and exerting said operating pressure thereon to close said ignition circuit through said contact means and at the same time tension the corresponding spring-biasing means, and each said spring-biasing means being capable of exerting a spring bias on the corresponding contact means to move it to open-circuit position when said throttle lever member is no longer exerting operating pressure thereon.

9. In the control system of claim 8 wherein each switch means includes a carrier member in the operative connection between said throttle lever member and said contact means, and said carrier member includes a projecting portion supporting the spring-biasing means for that switch means, said spring-biasing means being biased when supported on said projecting portion and exerting a spring bias on said carrier member to in turn move said corresponding contact means so as to open said ignition circuit when said throttle lever member is no longer exerting operating pressure on said carrier member.

10. The control system of claim 7 being adapted for a vehicle having a handlebar for steering the same, and wherein said housing member has a bore for receiving said handlebar therein in a position such that said throttle lever member is convenient to an operator having a hand on said handlebar, and said housing member having an outer wall thereon and a cavity internally of said wall for accommodating said multiple switch means and protecting the same from said weather and environmental conditions, an outside surface on said housing member wall against which a portion of said throttle lever member engages at some time in an engine-operating cycle, and said wall having said slot therein adjacent one switch means for receiving said pin for pivotal and transverse movement of said pin in said slot.

11. In the control system of claim 10 wherein said throttle lever member comprises a structure with an undersurface and a lower portion thereof engagable with said outside surface of said housing member and a pair of leg portions straddling the housing member and having a hole in each leg portion to receive said pin, a pivot bump on one leg portion engaging said outside surface and a projection on the other leg portion for operative connection with a second one of said switch means within said housing member, and a receptacle in said lever member adapted to receive the end of a spring-biased carburetor cable in a releasable connection therewith to permit ready replacement of a cable if one breaks.

12. In the control system of claim 11 wherein said housing member wall and said outside surface thereof has a portion adjacent said second one of said switch means, a bore in said wall to receive said projection on said other leg portion to operatively connect with said second one of said switch means and close the same and the ignition circuit therethrough.

13. In the control system as defined in claim 7 wherein said slot is elongated and said pin slot provide a lost-motion connection for said throttle lever member on said housing member, and with a first one of said switch means being positioned in said housing member adjacent said pin and slot.

14. In the control system of claim 13 wherein said elongated slot is in said housing member and said pin is in said throttle lever member, said first one of said switch means is operatively connected to said pin, two separated contact pins are provided for said one switch means, a mount in said housing member for said two contact pins, an insulating carrier having a projecting portion extending forwardly therefrom, an aperture in said mount between said two contact pins for receiving said projecting portion for slidable movement with respect to said mount, a spring contact member with an aperture fitting on said projecting portion and having contact portions for corresponding electrical contact with said two contact pins, and a compressible circular spring on said projecting portion between said mount and said contact member, a stud on said insulating carrier projecting therefrom oppositely to said projecting portion, a connecting member having a sleeve portion and a body portion with said sleeve portion connected with said stud in a bayonet connection, with said body portion being operatively connected with said pin in said throttle lever member and movable upon a switch-means-closing-operation of said throttle lever member to cause said contact portions to respectively engage said two contact pins and compress said spring on said projecting portion.

15. In the control system of claim 7 wherein said multiple interrelated switch means includes a second switch comprising an insulating carrier having a projecting portion, a mount in said housing member, a pair of contact pins secured in said mount, a bore in said mount between said contact pins receiving said projecting portion of said carrier, a compressible circular spring on said projecting portion, an apertured spring contact member mounted at the aperture thereof on said projecting portion for engagement with said two contact pins to close an ignition circuit through said contact member and corresponding contact pins, a projection on said throttle lever member at a face thereof operatively connecting with said insulating carrier to move the same forwardly in said housing member.

16. In the control system of claim 7 having a third switch therein, a mount for said third switch within said housing member, two contact pins on said mount for electrical connection with said ignition circuit, and a pivot pin also on said mount, said third switch including an insulating carrier having insulating pins thereon, a spring contact member releasably mounted with said insulating pins on said insulating carrier, an actuator pivotally supported on said mount and connected to said insulating carrier and with said carrier pivotally supported on said pivot pin, a button member on the outside of said housing member with said actuator connected to said button member, and a spring between said actuator and said carrier acting upon the pull of said button member outwardly from said housing member to provide a spring tension within said third switch and cause a toggle action in said actuator and insulating carrier to move said spring contact member into electrical connection with said two contact pins and close the ignition circuit through said third switch.

17. In the control system of claim 7 wherein said vehicle is a snowmobile with a seat for an operator therein open to both said described conditions, said steering means is a handlebar-type structure, and said housing member is mountable on said handlebar-structure in a position such that said throttle lever member is available to an operator in said seat steering said snowmobile at said handlebar, said switch means comprising a first and a second switch which are each selectively closed by said throttle lever member, said second switch being closed in an idle position of said throttle lever member and said first switch being closed upon pivotal actuation of said throttle lever member by said operator, with said first switch being closed and said second switch being open at full running speed for said snowmobile, and said control system acting in the event said operator loses control of said throttle lever member operation because said second switch is open and a stick from the brush or the like or the operator's glove wedges between such throttle lever member and said housing member to automatically open said first switch as a result of the pin and slot mounting for said throttle lever member and the spring-bias action of the carburetor cable connected to said latter member, and as a result of said spring-bias on each said contact means in each of said first and second switches moving and maintaining said contact means in open-circuit positions.

18. In the control system of claim 7 wherein said vehicle is a snowmobile with a seat for an operator therein open to both said described conditions, said steering means is a handlebar-type structure, and said housing member is mountable on said handlebar-structure in a position such that said throttle lever member is available to an operator in said seat steering said snowmobile at said handlebar, said multiple switch means comprising a first and a second switch that are each selectively closed or opened upon the pivotal actuation of said throttle lever member by said operator, and a third switch in said control system having switch means in said housing member and a button for operation thereof outside said housing member and available to said operator, said third switch being connectible to said ignition circuit and normally maintaining the same closed, and with said first and second switches connectible to said ignition circuit, with said ignition circuit being opened in the event of an emergency alternatively to the opening of said third switch and said ignition circuit upon the operator pushing said button, said latter opening of said ignition circuit being independently of the position of said first or second switches, and said first and second switches being opened automatically by the operation of a spring-biasing means therewith acting on the corresponding contact means when said operator no longer has control of said throttle lever member.

19. In the control system of claim 7 wherein said steering means is a handlebar, said housing member is in two parts secured together and has an insulating board secured within said housing at the juncture of said two parts and positioned substantially at right angles to the steering means extending through said bore of said housing member, with said opening in said housing member for receiving said spring-biased cable comprising a slot portion extending from the outside of said housing member inwardly to a cable bore and from the front to the rear of said housing member to permit a broken cable to be replaced in and secured to said throttle lever member without disassembling said housing member or removing the same from said steering means.

* * * * *